United States Patent Office 3,337,300
Patented Aug. 22, 1967

3,337,300
PROCESS FOR THE PRODUCTION OF PIGMENT FROM CONDITIONED AND CALCINED TITANIUM DIOXIDE PARTICLES
William Hughes, Norton, England, assignor to British Titan Products Company Limited, Billingham, England, a corporation of the United Kingdom
No Drawing. Filed July 8, 1964, Ser. No. 381,243
Claims priority, application Great Britain, July 29, 1963, 29,908/63
7 Claims. (Cl. 23—202)

The present invention relates to a process for the production of pigmentary titanium dioxide.

Pigmentary titanium dioxide is commonly made by the sulphate process wherein a titaniferous material, for example ilmenite, is dissolved in strong sulphuric acid at an elevated temperature and the titanium sulphate solution thus formed, after various purification steps, is subjected to thermal hydrolysis to produce insoluble hydrous titanium dioxide. The hydrolysis is normally carried out in the presence of anatase—or rutile—inducing nuclei, as desired.

The hydrous titanium dioxide, after further washing, particularly to remove colouring impurities is calcined, for example at a temperature in the range of about 800° C. to 1100° C.

The calcined product is then subjected to various milling techniques in the wet or dry state and classification procedures to ensure that the particle size of the product is as uniform as possible within the desired pigmentary range.

In addition to milling and classification, the calcined titanium dioxide particles are also commonly coated with hydrous oxides of elements such as aluminium, titanium, silicon, cerium or zirconium.

Before calcination, various conditioning agents are usually added to the hydrous titanium dioxide to modify the properties of the titanium dioxide during calcination. Examples of such pre-calcination additions are compounds of zinc, antimony or tin (particularly the oxides of these elements); potassium, sodium or aluminium compounds (particularly the sulphates, carbonates or hydroxides) and phosphorous-containing compounds (particularly phosphates). Generally, the compounds of zinc, antimony or tin are added to assist the conversion of the titanium dioxide to the rutile modifiaction and sometimes to ensure that this conversion takes place at a lower temperature than would otherwise be the case. The sodium, potassium and phosphorous-containing compounds are normally added to control the article size and improve the brightness generally.

Titanium dioxide to which some or all of such additions have been made is hereinafter referred to as "conditioned" titanium dioxide.

It has now been found that the presence of one or more of the pre-calcination additions may have a deleterious effect upon the pigmentary titanium dioxide produced, for example, their presence may prevent the full development of pigmentary properties in the final titanium dioxide pigment, particularly after sand milling, when estimated by tinting strength, gloss and/or tint reduction tests. Their presence may also render the pigmentary titanium dioxide less suitable for use in paints, particularly emulsion paints, by causing excessive reactivity between the titanium dioxide pigment and the paint media. This reactivity frequently results in gelling of such paints during storage.

It has also been found that when subjecting such conditioned titanium dioxide particles to sand milling (as hereinbefore defined), the power consumption of the sand mill is higher than desirable. This is believed to be due, at least partly, to the high viscosity of aqueous slurries containing such particles.

It may also be difficult to obtain satisfactory dispersions of the titanium dioxide particles for feeding to a sand mill unless a substantial amount of dispersing agent such as sodium silicate is added. The addition of large amounts of such dispersing agents may be undesirable particularly when pigment is required having a low content of silica, since some of the dispersing agent is retained on the titanium dioxide particles.

Furthermore, it has been found that aqueous slurries of calcined pigment with a solids content above about 750 g./litre, while flowing easily into the sand mill, undergo changes in rheology during milling which cause the bed of milling medium to expand, thereby decreasing the efficiency of the milling.

It is an object of the present invention to provide a process for the production of pigmentary titanium dioxide which avoids or reduces some or all of the above-mentioned disadvantages.

Accordingly, the present invention is a process comprising calcining conditioned titanium dioxide; leaching the calcined titanium dioxide with aqueous liquid; separating titanium dioxide containing a reduced amount of water-soluble compounds and thereafter subjecting the leached titanium dioxide to sand milling.

The conditioned titanium dioxide is suitably calcined at temperatures in the range of about 800° C. to 1100° C. The temperature of the calcination may vary depending upon whether anatase or rutile titanium dioxide is to be produced.

The calcined conditioned titanium dioxide may, conveniently, be leached by contact with an aqueous acid solution or with water only.

It is preferred to apply the process of the present invention to titanium dioxide to which, in addition to other conditioning agents, a rutile-inducing pre-calcination addition has been made and particularly when the pre-calcination addition is a zinc compound.

Amounts of conditioning agents added before calcination may vary widely but rutile-inducing agents such as compounds of zinc, antimony or tin are generally added in an amount in the range of about .01% to 1.3% by weight of $TiO_2$ (expressed as the oxide of the element).

Conditioning agents added before calcination to improve the texture or whiteness of the pigment, for example, potassium, sodium or aluminium compounds (e.g. sulphates) or compounds containing phosphorous (e.g. phosphates) particularly ammonium phosphate are generally added in an amount in the range of about .01% to 1% by weight of $TiO_2$ (estimated as the oxide of the compound added).

The aqueous liquid with which the calcined titanium dioxide is contacted is suitably water or an aqueous solution of a mineral acid, particularly an aqueous sulphuric acid solution. Where aqueous acid solution is used a convenient acid concentration is in the range 0.5% to 10% and it is preferred to use aqueous acid of between 1% and 5% concentration. These concentrations are on a weight/weight basis.

The titanium dioxide is preferably contacted with the aqueous liquid above room temperature, for example above about 90° C. If the aqueous liquid and titanium dioxide are to be separated under reduced pressure after leaching (for example, by filtration under reduced pressure), it is advisable to allow the mixture to cool, for example to a temperature below 60° C., to avoid "flashing off" of water under these conditions.

A particularly suitable method of contacting the titanium dioxide with aqueous liquid at an elevated temperature is to discharge the calcined titanium dioxide at 500–1000° C. directly into the aqueous liquid which may be at room temperature. By this means the heat retained by the titanium dioxide is sufficient to heat the liquid and the contact between hot titanium dioxide and cool aqueous liquid may also assist in breaking down the aggregates of titanium dioxide particles formed during calcination.

Alternatively, in order to provide an increased area of titanium dioxide in contact with the aqueous liquid the calciner discharge may be subjected to milling, for example in a fluid energy, swing hammer, ball or ring roller mill before contacting with aqueous acid.

The titanium dioxide should be maintained in contact with the water, preferably with agitation, until at least the greater part of the compounds soluble in the water have been leached out. The time required to accomplish this will vary, particularly with the strength of aqueous acid (if used) with the temperature at which the leaching is carried out and with the particle size of the material being leached.

A water soluble solids content in the pigment after leaching of less than about 0.15% and preferably less than about 0.1% has been found very suitable for the process of the present invention.

After contacting the titanium dioxide with aqueous liquid for the desired length of time the titanium dioxide is separated by any suitable method, for example filtration, decantation or by the use of a centrifuge. After separation the titanium dioxide is preferably washed with water particularly if the solid has been separated by filtration or decantation.

The leached titanium dioxide is then generally slurried with water and a dispersing agent is preferably added before sand milling. Any known dispersing agent may be used, for example inorganic agents such as sodium silicate or sodium polyphosphate (e.g. hexametaphosphate) or an organic dispersing agent may be used, if desired.

Organic dispersing agents which have been found to be particularly suitable are organic amines and particularly an alkanolamine such as an ethanolamine or propanolamine, particularly mono-isopropanolamine, either by themselves or with an inorganic dispersing agent, for example, sodium silicate.

By the use of monoisopropanolamine it has been found that pigment of improved tinting strength either before or after subsequent coating can be obtained when compared with inorganic dispersing agents, such as sodium silicate, under similar milling conditions or, alternatively, similar results can be obtained in shorter milling time.

Particularly good results have been obtained with monoisopropanolamine and sodium silicate, for example, using about 0.2% monoisopropanolamine and about 0.1% sodium silicate.

Hydroxyamino compounds are also very suitable organic dispersing agents.

The dispersing agent when present may be used in a concentration up to 3%, particularly one in the range 0.05 to 0.5% by weight on $TiO_2$.

The dispersed slurry thus formed is then subjected to sand milling. By the term "sand milling" is meant vigorous agitation of the titanium dioxide with grinding elements consisting of inert particles for example those having a particle size in the range 300 microns to 1,000 microns, preferably having a particle size in the range 500 microns to 900 microns. Suitable inert particles are those consisting of silica (for example Ottawa sand); hard titanium dioxide or glass ballotini. Particularly suitable devices for sand milling are described in our British Patent 900,050 and in co-assigned U.S. Patent No. 3,185,398, issued to William Hughes et al. on May 25, 1965 and in British Patents 686,234 and 810,005.

By subjecting the conditioned and calcined titanium dioxide to sand milling after leaching, for example with aqueous acid, it has been found that the titanium dioxide produced may, after further treatment, develop a higher tinting strength, tint reduction value, gloss (when incorporated in to a paint film) and reduced drying time than can conditioned and calcined titanium dioxide after leaching and without sand milling or with sand milling without leaching.

Furthermore, after leaching with water or aqueous acid, a higher concentration of $TiO_2$ may be used in the sand mill without lifting of the sand bed and consequent decrease in the effectiveness of the milling. This leads to a substantial increase in the amount of pigment which can be treated by the mill in a given time.

After sand milling the titanium dioxide produced by the process of the present invention is preferably subjected to additional known treatments, for example to coating with hydrous oxides of elements such as aluminium, silicon, titanium, cerium and/or zirconium followed by drying and additional milling. The final milling is preferably carried out in a fluid energy mill. One type of fluid energy mill which may be used for this purpose is that described in co-assigned U.S. Patent No. 3,260,467, issued to Twist et al. on July 12, 1966. Other types of fluid energy mills which may be used are the "Microniser" or "Kidwell" mill.

In addition to the development of higher tinting strength, gloss and tint reduction the titanium dioxide pigment produced by the present invention may also show decreased reactivity with the media when incorporated into emulsion paints, thus providing emulsion paints having a longer storage life without deterioration.

The following examples show embodiments of the present invention.

EXAMPLE 1

Calciner discharge rutile titanium dioxide particles containing 0.25% zinc (as ZnO) and 0.5% potassium sulphate were subjected to milling in a swing hammer mill and were then mixed with dilute sulphuric acid to a concentration of 250 g./litre. (The sulphuric acid solution contained 15 g. $H_2SO_4$/litre.) The temperature of the slurry was raised to 93° C. and this temperature was maintained for 1 hour. The titanium dioxide particles were filtered off and were found to retain about 0.05% water soluble solids. The particles were then washed and reslurried with water containing 0.1% sodium silicate (as $SiO_2$) to give a $TiO_2$ concentration of 850 g./litre and the slurry was subjected to sand milling in a 10 inch diameter sand mill of the type described in co-assigned U.S. Patent No. 3,185,398, issued to William Hughes et al. on May 25, 1965. The impellers were rotated at a speed of about 1300 r.p.m. The retention time in the mill was about 28 mins.

The $TiO_2$ pigment, after separation from the grinding medium, was wet coated with hydrous oxides of aluminium (1.5% as $Al_2O_3$) and titanium (1.1% as $TiO_2$), filtered, washed, dried and subjected to fluid energy milling.

The tinting strength, tint reduction and the gloss rating of the product were estimated and are given in the table below.

The tinting strentgh was estimated by the Reynolds Blue method.

The tint reduction value was estimated by milling the $TiO_2$ pigment in a linseed oil-modified alkyd resin to give a pigment volume concentration of 18.6%. One percent of a premilled black pigment was then incorporated into the paint thus produced and the intensity of a dry film of the paint was assessed relative to a paint similarly prepared from a standard $TiO_2$ pigment arbitrarily assessed at 100.

The results are expressed as 100+ the percentage of black pigment required to match the standard paint. For example, a figure 101 indicates that it would be necessary to add 1% more of the black pigment to the paint produced from the $TiO_2$ tested to match the tint of the standard paint. Consequently, the higher the figure given the greater the tinting power of the $TiO_2$ tested.

The gloss rating was estimated by incorporating the

TiO$_2$ pigment (at a pigment volume concentration of 22.2%) into a mixture of a non-drying glycerol alkyd resin and a modified urea-formaldehyde resin (2:1 by weight) by ball milling for 16 hours. The paint produced was applied to a sheet of glass and the glass stoved at 120° C. for 30 minutes.

The gloss of the stoved film was compared by means of a Hunterlabs "Sharpness of Image" Glossmeter with the gloss of a standard surface and expressed as a percentage of this.

EXAMPLE 2

A process similar to that described in Example 1 was carried out in which water was used as the leaching medium in place of aqueous acid.

The slurry of TiO$_2$ in water was heated to 90° C. over a period of 3½ hours and maintained at this temperature for 1 hour.

The leached product (which retained about 0.05% water soluble solids) was mixed with water containing 0.1% sodium silicate to a concentration of 1000 g./litre before sand milling. No lifting of the bed of grinding medium occurred.

EXAMPLE 3

TiO$_2$ pigment was produced and tested by processes similar to those described in Example 1 except that the pigment was leached in hot water and was not sand milled.

EXAMPLE 4

TiO$_2$ pigment was prepared and tested by processes similar to those described in Example 2 except that the calciner discharge was not leached before sand milling. The maximum loading of the sand mill obtainable was about 750 g./litre before lifting of the bed of grinding medium occurred, causing decreased efficiency of milling.

TABLE I

| Product prepared as in Example— | Tinting Strength | Tint Reduction | Gloss Rating |
|---|---|---|---|
| 1 | 1,940 | 115 | 93 |
| 2 | 1,940 | 115 | 93 |
| 3 | 1,720 | 99 | 90 |
| 4 | 1,870 | 110 | 91 |

EXAMPLE 5

Dry milled calciner discharge rutile titanium dioxide containing 0.25% zinc (as ZnO) and 0.5% potassium sulphate was boiled for 3 hours at a concentration of 350 g./litre with dilute sulphuric acid (20 g./litre). The product (which contained about 0.05% water soluble solids) was then filtered off, washed and formed into a slurry at a concentration of 750 g. TiO$_2$/litre. The slurry also contained 0.5% sodium silicate (as SiO$_2$).

The slurry was divided into two parts, one of which was ball milled for 16 hours and the other sand milled. Samples were removed from the sand mill after varying periods of time (as shown in the table).

After milling, the material was coated with aluminum and titanium oxides and the tinting strength, tint reduction value and optical density of the products estimated. The results obtained are given in Table II.

TABLE II

| | Tinting Strength | Tint Reduction Value | Optical Density |
|---|---|---|---|
| Ball milled 16 hours | 1,810 | 106 | 0.78 |
| Sand milled 60 minutes | 1,845 | 109 | 0.91 |
| Sand milled 120 minutes | 1,885 | 113 | 0.97 |

The optical density is a measure of the amount of light transmitted through a dilute aqueous suspension of the pigment.

EXAMPLE 6

Conditioned calciner discharge rutile titanium dioxide (to which have been added 1% zinc) (estimated as ZnO), 0.5% potassium sulphate and sufficient phosphate to give 0.25% (as P$_2$O$_5$) was mechanically pulverised and dropped into water at about 60° C. The mixture was stirred for 10 minutes after which it was passed to a solid bowl-type continuous centrifuge wherein the solids were separated from the liquid.

The solids (containing about 0.1% water soluble solids) were reslurried with water at a concentration of 620 grams per litre using the minimum amount of sodium silicate necessary to give a satisfactory dispersion for sand milling and the dispersion was then fed at a rate of 0.5 litres/min. to a sand mill comprising a container of 10 inches internal diameter and 3 ft. in height in which was rotated a shaft at 1400 r.p.m. The shaft carried six 8 inch impellers. A charge of 110 lbs. of Ottawa sand of particle size in the range 60 to 30 B.S.S. mesh was initially placed in the container.

The sand was separated from the milled pigment as the latter overflowed from the top of the container and the milled titanium dioxide was wet coated with 1.5% TiO$_2$ and 2% Al$_2$O$_3$ after which it was dried and subjected to fluid energy milling.

The above process was repeated on a similar calciner discharge which was not subjected to leaching before sand milling.

During both runs the power consumed (in kilowatts) by the mill was noted and this was compared with the power required to operate the sand mill at the same speed using a similar amount of sand and with a feed of water (without pigment) at a rate of 0.5 litres/min.

The viscosity of the slurry (cp. at 250 sec.$^{-1}$) fed to the sand mill and the tinting strength of the final product were also tested in each case.

The results obtained are given below.

| Material Milled | Power Consumed by Sand Mill | Power consumed in milling pigment | Viscosity of slurry feed | Amount fo dispersing agent required (Percent as SiO$^2$) |
|---|---|---|---|---|
| Unleached TiO$_2$ | 6.7 | 2.2 (6.7–4.5) | 3.45 | 1.4 |
| Leached TiO$_2$ | 5.6 | 1.1 (5.6–4.5) | 1.6 | 0.4 |
| Sand plus water only | 4.5 | | | |

The table shows that after leaching, the viscosity of the slurry feed is much less and the titanium dioxide is satisfactorily dispersed using less than one third of the quantity of sodium silicate as dispersing agent. The power consumed in milling the unleached pigment is twice that required for the leached pigment. The tinting strength of the final product is substantially higher (1840 compared with 1800) in the case of the leached material.

EXAMPLE 7

The process described in Example 6 was repeated but the solids, after leaching, were recovered by filtration and had a water soluble solids content of 0.04%. The material before sand milling was dispersed in the presence of 0.2% monoisopropanolamine in place of sodium silicate.

EXAMPLE 8

The process described in Example 7 was repeated but a mixture of 0.2% monoisopropanolamine and 0.1% sodium silicate was used to disperse the solids before sand milling.

The tinting strength and tint reduction values obtained (as previously described) on the product from these examples is given below:

| Example | Tinting Strength | Tint Reduction |
|---------|------------------|----------------|
| 7       | 1,840            | 112            |
| 8       | 1,860            | 113            |

In addition, the pigments prepared by the process of the present invention may show decreased electrical conductivity due to the removal of water-soluble salts, particularly if, when a dispersing agent is used during sand milling, this is an organic compound, for example monoisopropanolamine, rather than an inorganic dispersing agent.

What is claimed is:

1. In the process for producing titanium dioxide pigment in which a calcined titanium dioxide which was conditioned by the precalcination addition of a titanium dioxide conditioning agent selected from the group consisting of conditioning compounds of zinc, antimony, tin, potassium, sodium, aluminum and phosphorous is subjected to milling to reduce it to pigment particle size, the improvement which comprises the sequential steps of leaching said calcined titanium dioxide with an aqueous leaching liquid until the water-soluble solids content of said titanium dioxide is less than about 0.15% and sand milling the leached titanium dioxide.

2. A process in accordance with claim 1 wherein said aqueous leaching liquid is an aqueous mineral acid having a concentration in the range of 0.5 to 10% by weight.

3. A process in accordance with claim 1 wherein the aqueous leaching liquid is at a temperature above about 90° C. during said leaching step.

4. A process in accordance with claim 1 wherein the sand milling of the leached titanium dioxide is effected in the presence of from 0.05% to 3% by weight based on $TiO_2$ of a dispersing agent.

5. A process in accordance with claim 4 wherein the dispersing agent is present in an amount less than about 0.5% by weight and wherein said dispersing agent is selected from the group consisting of ethanolamines, propanolamines, sodium silicate and sodium hexametaphosphate.

6. A process in accordance with claim 1 wherein (a) said aqueous leaching liquid comprises mineral acid in a concentration range of 1 to 5% by weight;
(b) said aqueous leaching liquid and said calcined titanium dioxide are mixed following calcination of said titanium dioxide while said calcined titanium dioxide is at an elevated temperature, the proportion of hot titanium dioxide mixed being sufficient to heat said aqueous leaching liquid to a temperature in excess of 90° C.;
(c) said leaching is continued until the water-soluble solids content of said titanium dioxide is less than 0.1% by weight;
(d) a dispersing agent selected from the group consisting of ethanolamines, propanolamines, sodium silicate, and sodium hexametaphosphate is present during said sand milling step in a concentration in the range of 0.05% to 0.5% by weight based on $TiO_2$; and
(e) the inert particles employed as the milling medium in said sand milling step have a size in the range of 300 to 1000 microns.

7. A process in accordance with claim 6 wherein said dispersing agent is monoisopropanolamine.

References Cited

UNITED STATES PATENTS

| | | | |
|---|---|---|---|
| 1,885,921 | 11/1932 | Kubin | 106—300 |
| 1,892,693 | 1/1933 | Blumenfeld et al. | 23—202 |
| 2,273,431 | 2/1942 | Booge | 23—202 |
| 2,296,618 | 9/1942 | Patterson | 106—300 |
| 2,516,548 | 7/1950 | Cauwenberg et al. | 23—202 |
| 2,737,460 | 3/1956 | Werner | 106—308 X |
| 2,766,133 | 10/1956 | Marcot et al. | 23—202 X |
| 2,855,156 | 10/1958 | Hochberg et al. | |
| 2,933,408 | 4/1960 | Dempster et al. | 106—300 |
| 3,015,573 | 1/1962 | Myers et al. | 106—300 |
| 3,076,719 | 2/1963 | Whately et al. | 106—300 |
| 3,086,877 | 4/1963 | Sheehan et al. | 106—300 |
| 3,212,911 | 10/1965 | Berstein et al. | 106—39 |

FOREIGN PATENTS 664,268  6/1963  Canada.

OSCAR R. VERTIZ, *Primary Examiner.*

EDWARD STERN, *Examiner.*